US012592031B2

(12) United States Patent
Duan et al.

(10) Patent No.: US 12,592,031 B2
(45) Date of Patent: Mar. 31, 2026

(54) IMAGE PROCESSING METHOD, APPARATUS, DEVICE, AND STORAGE MEDIUM

(71) Applicant: Lenovo (Beijing) Limited, Beijing (CN)

(72) Inventors: Yong Duan, Beijing (CN); Liuxin Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 210 days.

(21) Appl. No.: 18/484,520

(22) Filed: Oct. 11, 2023

(65) Prior Publication Data

US 2024/0169667 A1 May 23, 2024

(30) Foreign Application Priority Data

Nov. 18, 2022 (CN) .......................... 202211449722.6

(51) Int. Cl.
G06T 17/00 (2006.01)
G06T 7/70 (2017.01)

(52) U.S. Cl.
CPC ................ G06T 17/00 (2013.01); G06T 7/70 (2017.01)

(58) Field of Classification Search
CPC ......... G06T 17/00; G06T 7/70; G06T 19/006; G06F 3/011
See application file for complete search history.

(56) References Cited

U.S. PATENT DOCUMENTS

| | | | | |
|---|---|---|---|---|
| 2017/0371405 | A1* | 12/2017 | Kwon | ..................... G06T 15/40 |
| 2018/0349690 | A1* | 12/2018 | Rhee | ..................... H04N 13/239 |
| 2019/0037137 | A1* | 1/2019 | Toksvig | ............... H04N 21/816 |
| 2019/0122388 | A1* | 4/2019 | Li | ........................... H04N 23/90 |
| 2019/0265841 | A1* | 8/2019 | Cheng | ................. G06F 3/04883 |

* cited by examiner

*Primary Examiner* — Hai Tao Sun
*Assistant Examiner* — Thomas John Foster
(74) *Attorney, Agent, or Firm* — ANOVA LAW GROUP, PLLC

(57) ABSTRACT

An image processing method includes: obtaining first spatial coordinates of a virtual three-dimensional object, where the virtual three-dimensional object is a three-dimensional object displayed in space in naked-eye 3D; obtaining second spatial coordinates of the spatial entity; determining an intersection space and positional relationship between the virtual three-dimensional object and the spatial entity according to first spatial coordinates and second spatial coordinates; and hiding a display of the virtual three-dimensional object in the intersection space according to the positional relationship.

16 Claims, 9 Drawing Sheets

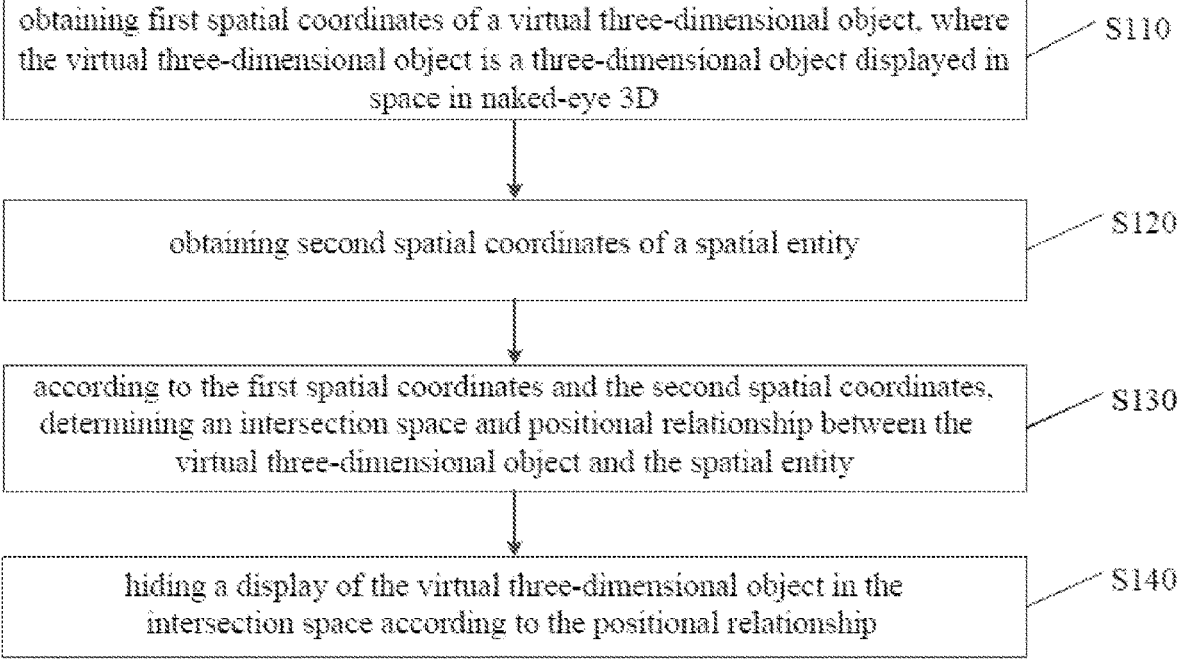

obtaining first spatial coordinates of a virtual three-dimensional object, where the virtual three-dimensional object is a three-dimensional object displayed in space in naked-eye 3D — S110 obtaining second spatial coordinates of a spatial entity — S120 according to the first spatial coordinates and the second spatial coordinates, determining an intersection space and positional relationship between the virtual three-dimensional object and the spatial entity — S130 hiding a display of the virtual three-dimensional object in the intersection space according to the positional relationship — S140

FIG. 1A obtaining a first reference coordinate system                                    S210 obtaining a second reference coordinate system of the spatial entity             S220 determining coordinate system transformation information according to the
second reference coordinate system and the first reference coordinate system     S230

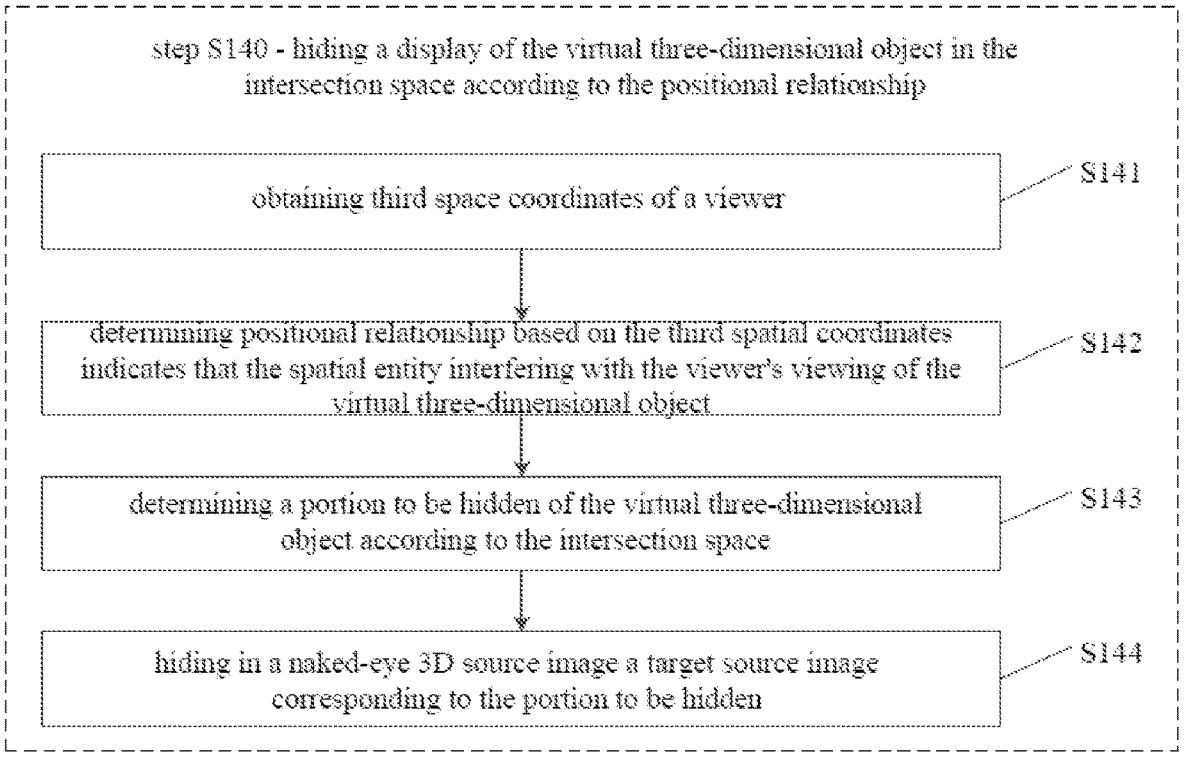

step S140 - hiding a display of the virtual three-dimensional object in the intersection space according to the positional relationship obtaining third space coordinates of a viewer — S141 determining positional relationship based on the third spatial coordinates indicates that the spatial entity interfering with the viewer's viewing of the virtual three-dimensional object — S142 determining a portion to be hidden of the virtual three-dimensional object according to the intersection space — S143 hiding in a naked-eye 3D source image a target source image corresponding to the portion to be hidden — S144

FIG. 3B

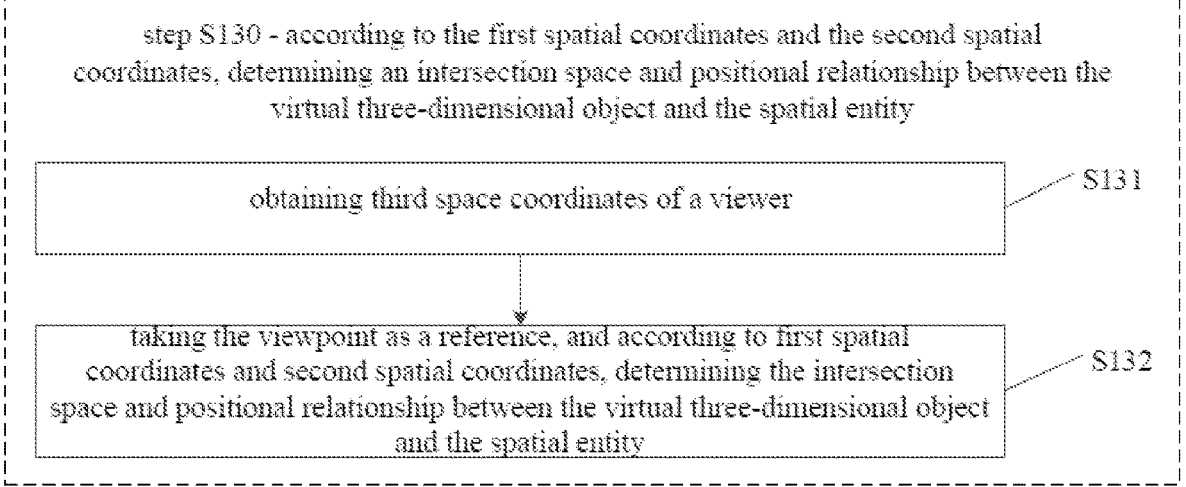

step S130 - according to the first spatial coordinates and the second spatial coordinates, determining an intersection space and positional relationship between the virtual three-dimensional object and the spatial entity obtaining third space coordinates of a viewer — S131 taking the viewpoint as a reference, and according to first spatial coordinates and second spatial coordinates, determining the intersection space and positional relationship between the virtual three-dimensional object and the spatial entity — S132

FIG. 4

IMAGE PROCESSING METHOD, APPARATUS, DEVICE, AND STORAGE MEDIUM

RELATED APPLICATION(S)

This application claims priority to Chinese Patent Application No. 202211449722.6 filed with the National Intellectual Property Administration, PRC on Nov. 18, 2022, which is incorporated herein by reference in entirety.

FIELD OF THE TECHNOLOGY

The present disclosure relates to the field of image processing, including but not limited to an image processing method, apparatus, device, and storage medium.

BACKGROUND

When a position of a virtual three-dimensional object based on naked-eye 3D display overlaps with a position of a spatial entity (such as the user's hand) in space, because the viewer sees the visual information of the virtual three-dimensional object and the spatial entity (e.g., the hand) at the same time, the two overlap to form a visual conflict, which leads to a loss of the spatial sense and a compromise on the effect of the virtual three-dimensional object display.

SUMMARY

Embodiments of the present disclosure provide an image processing method, apparatus, device and storage medium.

The technical solution of certain embodiments of the present disclosure includes the following aspects.

In a first aspect, the present disclosure provides an image processing method, the method including: obtaining first spatial coordinates of a virtual three-dimensional object, where the virtual three-dimensional object is a three-dimensional object displayed in space in naked-eye 3D; obtaining second spatial coordinates of a spatial entity; according to first spatial coordinates and second spatial coordinates, determining an intersection space and positional relationship between the virtual three-dimensional object and the spatial entity; and hiding a display effect of the virtual three-dimensional object in the intersection space according to the positional relationship.

In a second aspect, the present disclosure provides an image processing apparatus, the apparatus including: a memory storing computer program instructions; and a processor coupled to the memory and configured to execute the computer program instructions and perform: obtaining first spatial coordinates of a virtual three-dimensional object, wherein the virtual three-dimensional object is a three-dimensional object displayed in space in naked-eye 3D; obtaining second spatial coordinates of a spatial entity; according to first spatial coordinates and second spatial coordinates, determining an intersection space and positional relationship between the virtual three-dimensional object and the spatial entity; and hiding a display effect of the virtual three-dimensional object in the intersection space according to the positional relationship.

In a third aspect, the present disclosure provides an electronic device, including a memory and a processor, where the memory stores a computer program to be executed on the processor, and where when executing the program, the processor implements the image processing method.

In a fourth aspect, the present disclosure provides a storage medium, storing executable instructions for causing a processor to implement the image processing method.

In certain embodiments of the present disclosure, first spatial coordinates of the virtual three-dimensional object is obtained; second spatial coordinates of the spatial entity is obtained; according to first spatial coordinates and second spatial coordinates, intersection space and positional relationship between the virtual three-dimensional object and the spatial entity is determined; and a display effect of the virtual three-dimensional object in the intersection space is reduced according to the position relationship. In this way, the display effect of virtual three-dimensional objects in the intersection space is hidden or made invisible to avoid the problem of 3D failure caused by the overlap of the spatial entity and the virtual three-dimensional object.

BRIEF DESCRIPTION OF THE DRAWINGS

FIG. 1A is a schematic flow chart of an implementation of an image processing method according to certain embodiments of the present disclosure;

FIG. 3B is a schematic flow chart for reducing a display effect of a virtual three-dimensional object according to certain embodiments of the present disclosure;

FIG. 4 is a schematic flow chart of the implementation of determining an intersection space and positional relationship between a virtual three-dimensional object and a spatial entity according to certain embodiments of the present disclosure;

DETAILED DESCRIPTION

Figure 1B:
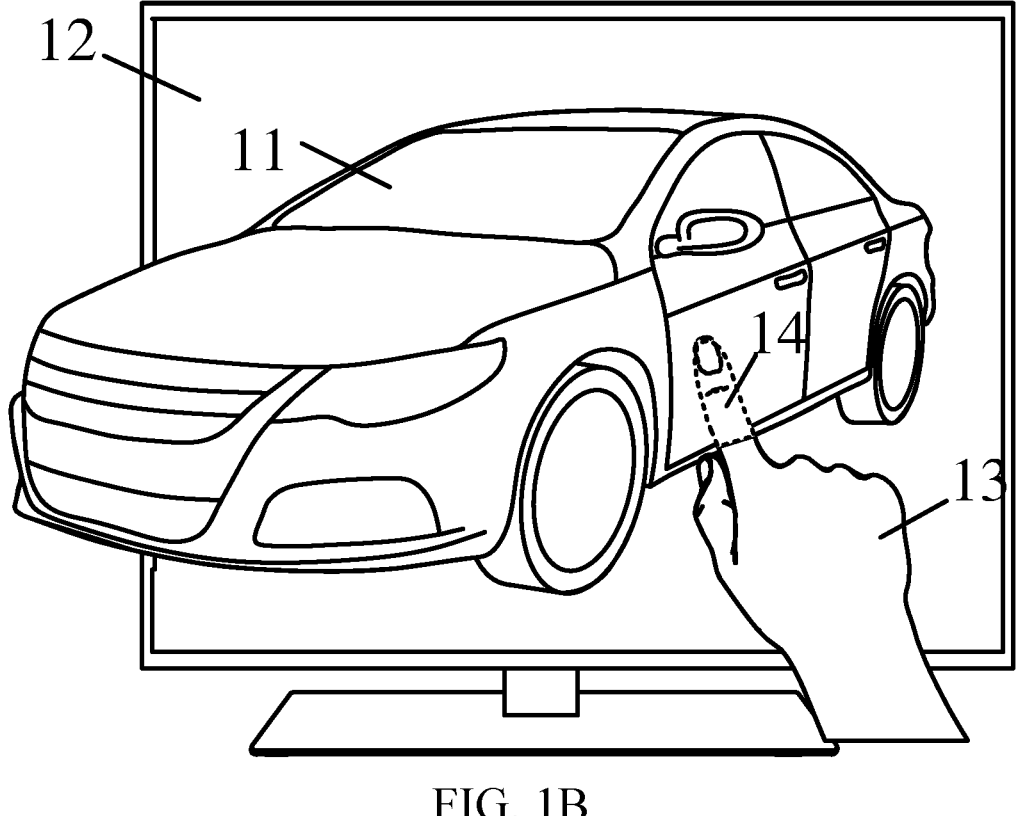
FIG. 1B is a schematic diagram of a virtual three-dimensional car overlapping a hand according to certain embodiments of the present disclosure.

To make clearer the purpose, technical solutions and advantages of certain embodiments of the present disclosure, technical solutions of certain embodiments of the present disclosure are described in detail below in conjunction with the drawings. The following examples are used to illustrate the present disclosure but are not intended to limit the scope of the present disclosure.

In the following description, reference may be made to "certain embodiments," "certain embodiments," "some embodiments," and "some embodiments," which describe a subset of all possible embodiments, may be the same subset or a different subset of all possible embodiments, and may be combined with each other without conflict.

As may be applicable, the terms "first\second\third" are only used to distinguish similar objects and do not necessarily represent a specific order of objects. The terms "first\second\third" are directed to a specific order or sequence may be interchanged so that certain embodiments of the present disclosure may be practiced in an order other than that illustrated or described herein.

Unless otherwise defined, all technical and scientific terms used herein have the same meaning as commonly understood by one of ordinary skill in the technical field to which this disclosure belongs. The terms used herein are only for the purpose of describing certain embodiments of the present disclosure and are not intended to limit the present disclosure.

Certain embodiments of the present disclosure provides an image processing method, as shown in FIG. 1A, the method includes:

Step S110: Obtaining first spatial coordinates of a virtual three-dimensional object, where the virtual three-dimensional object is a three-dimensional object displayed in space through naked-eye 3D ("Autostereoscopy").

Naked-eye 3D (Autostereoscopy) is a general term for technologies that achieve stereoscopic visual effects without the use of external tools such as polarized glasses. With naked-eye 3D technology, viewers directly view virtual three-dimensional objects displayed in space. The position of the virtual three-dimensional object in space is expressed by establishing a coordinate system based on the 3D screen, that is, first spatial coordinates of the virtual three-dimensional object may be established based on the 3D screen.

In certain embodiments, first spatial coordinates of the virtual three-dimensional object is determined based on the world coordinate system. In certain embodiments, a conversion relationship between the coordinate system based on the screen and the world coordinate system is obtained, and first spatial coordinates based on the screen is converted into first spatial coordinates based on the world coordinate system, according to the conversion relationship.

In certain embodiments, first spatial coordinates of the virtual three-dimensional object is based on a fixed object in a viewing space.

There is no restriction on the reference datum of first spatial coordinates.

Step S120: Obtaining second spatial coordinates of a spatial entity.

In certain embodiments, a camera device is used to obtain second spatial coordinates of the spatial entity. For example, a camera device configured on a 3D screen is used to obtain second spatial coordinates of the spatial entity. In this way, second spatial coordinates can be determined based on the camera device.

In certain embodiments, second spatial coordinates of the spatial entity is determined based on the world coordinate system. In certain embodiments, a conversion relationship between the coordinate system based on the camera device and the world coordinate system is obtained, and second spatial coordinates based on the camera device are converted to second spatial coordinates based on the world coordinate system, according to the conversion relationship.

In certain embodiments, second spatial coordinates of the spatial entity is based on a fixed object in the viewing space.

There is no restriction on the reference datum of second spatial coordinates.

There is no limit on the order in which step S110 and step S120 are executed. That is, step S110 may be executed first and then step S120 is executed, step S120 may be executed first and then step S110 is executed, or step S110 and step S120 are executed simultaneously.

Step S130: Determining an intersection space and positional relationship between the virtual three-dimensional object and the spatial entity based on first spatial coordinates and second spatial coordinates.

In certain embodiments, and to determine whether the virtual three-dimensional object overlaps with the spatial entity, the reference coordinate system of the virtual three-dimensional object and the reference coordinate system of the spatial entity are calibrated and registered. Any suitable methods of computer vision may be used to achieve registration and conversion of the two spatial coordinate systems.

In certain embodiments, if the camera device is installed on top of the screen (such as the front camera device of a laptop) and the camera device does not directly capture the screen, a mirror may be used to calculate the positional relationship between the camera device and the screen, where the mirror is placed in front of the screen such that the camera device sees the screen through the reflection of the mirror and perform calibration calculations.

In certain embodiments, the relative position of the camera device and the screen is unchanged. In certain embodiments, the conversion relationship between the two spatial coordinate systems (the coordinate system based on the camera device and the coordinate system based on the screen) is obtained, this conversion relationship is used to perform the conversion of first spatial coordinates and second spatial coordinates, such that the bases of first spatial coordinates and second spatial coordinates are the same.

In certain embodiments, the intersection space and positional relationship between the virtual three-dimensional object and the spatial entity is determined by using first spatial coordinates and second spatial coordinates of a unified reference, after the registration and/or conversion of the two spatial coordinate systems is performed.

A spatial intersection is an overlap between the virtual three-dimensional object and the spatial entity. The positional relationship is used to characterize the positional relationship in space between the virtual object and the spatial entity. In certain embodiments, the positional relationship is determined according to whether the virtual object as seen by the viewer is visually located in front of the spatial entity. For example, when the virtual object is a ball and the spatial entity is a hand, it is determined based on the positional relationship between the ball and the hand as to whether the ball seen by the viewer is in front of the hand or behind the hand.

Step S140: Hiding the display of the virtual three-dimensional object in the intersection space based on the position relationship.

When it is determined based on the positional relationship that there is an intersection space between the spatial entity and the virtual three-dimensional object, and the intersection space affects the viewing effect to the viewer, the display effect of the virtual three-dimensional object in the intersection space is reduced or hidden, to reduce the impact on the viewing effect.

For example, when the virtual object is a ball and the spatial entity is a hand, based on the positional relationship between the ball and the hand, it is determined that the ball seen by the viewer is behind the hand. The hand and the ball overlap in space, and the three-dimensional display effect of the ball reduces to cause the problem of 3D display failure. The intersection display effect of the ball and the hand is reduced or hidden to avoid the problem of 3D display failure caused by the overlap of the hand and the ball.

FIG. 1B is a schematic diagram of a virtual three-dimensional car overlapping a hand according to certain embodiments of the present disclosure. As shown in FIG. 1B, the schematic diagram includes a virtual three-dimensional car 11, a naked-eye 3D screen 12, a hand 13, and the intersection space 14 between the hand 13 and the virtual three-dimensional car.

The viewer sees the virtual three-dimensional car 11 virtualized in space by the naked-eye 3D screen 12, the hand 13 points to the virtual three-dimensional car 11, and there is an intersection space 14 between the hand 13 and the virtual three-dimensional car. In certain embodiments, the intersection space 14 in the virtual three-dimensional car 13 is reduced or hidden, thus an overlap or intersection between the hand 13 and the virtual three-dimensional car 11 and hence the problem of 3D failure is avoided.

In certain embodiments, first spatial coordinates of the virtual three-dimensional object is obtained; second spatial coordinates of the spatial entity is obtained; and according to first spatial coordinates and second spatial coordinates, the intersection space and position relationship between the virtual three-dimensional object and the spatial entity are determined; and the display effect of the virtual three-dimensional object in the intersection space is reduced or hidden according to the position relationship. In this way, the display effect of virtual three-dimensional object in the intersection space may be reduced or hidden to minimize the problem of 3D failure caused by the overlap of the spatial entity and the three-dimensional object.

Figure 2:
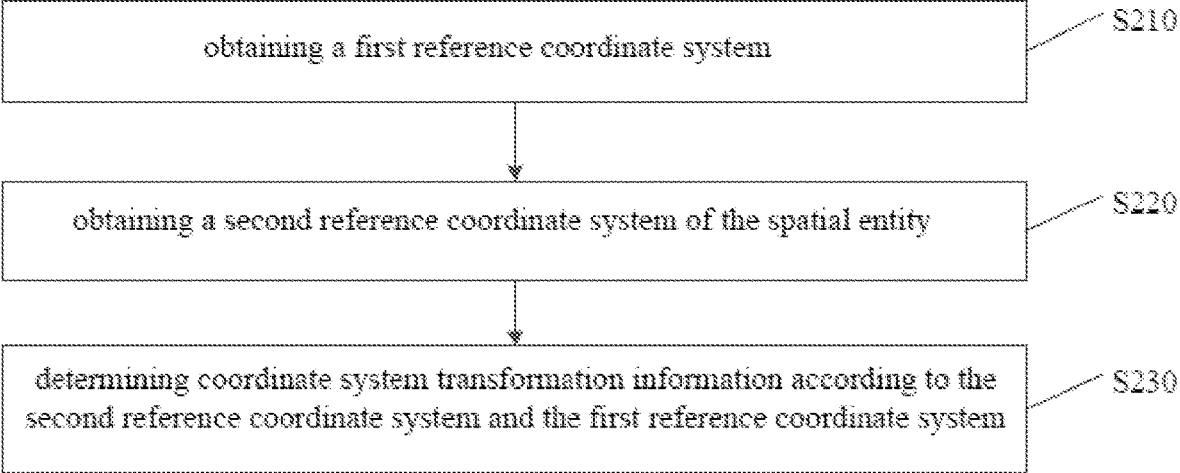
FIG. 2 is a schematic flowchart of an implementation process for determining coordinate system conversion information according to certain embodiments of the present disclosure.

In certain embodiments, first spatial coordinates are calibrated according to the first reference coordinate system of the virtual three-dimensional object. This embodiment of the present disclosure provides a schematic flow chart of a method for determining coordinate system conversion information, as shown in FIG. 2, the method includes:

Step S210: Obtaining the first reference coordinate system.

In certain embodiments, the first reference coordinate system is calibrated with the coordinate system of the 3D screen as the first reference coordinate system, or is calibrated with the world coordinate system as the first reference coordinate system, or calibration by selecting a fixed object in the viewing space as the first reference coordinate system. There is no restriction on the first reference coordinate system.

Step S220: Obtaining the second reference coordinate system of the spatial entity;

In certain embodiments, the second reference coordinate system is calibrated with the coordinate system of the camera device as the second reference coordinate system, or is calibrated with the world coordinate system as the second reference coordinate system, or is calibrated by selecting a fixed object in the viewing space as the second reference coordinate system. There is no restriction on the second reference coordinate system.

There is no limit on the order in which step S210 and step S220 are executed. In certain embodiments, step S210 is executed first and then step S220 is executed, step S220 is executed first and then step S210 is executed, or step S210 and step S220 are executed simultaneously.

Step S230: Determining coordinate system conversion information according to the second reference coordinate system and the first reference coordinate system.

In certain embodiments, first spatial coordinates of the virtual three-dimensional object and second spatial coordinates of the spatial entity are calibrated using the same basis as the reference coordinate system, it is helpful to determine the coordinate conversion information between the first reference coordinate system and the second reference coordinate system.

In certain embodiments, the first reference coordinate system is obtained; the second reference coordinate system of the spatial entity is obtained; and the coordinate system conversion information is determined according to the second reference coordinate system and the first reference coordinate system. In this way, the coordinate conversion information between the first reference coordinate system and the second reference coordinate system is determined, to obtain first spatial coordinates of the virtual three-dimensional object and second spatial coordinates of the spatial entity using the same basis as the reference coordinate system.

Figure 3A:
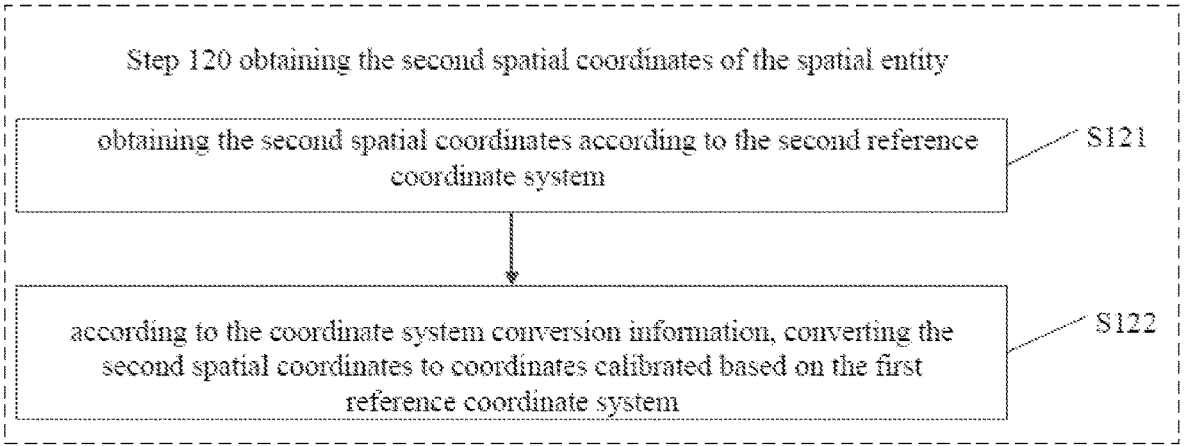
FIG. 3A is a schematic flowchart of an implementation process for obtaining second spatial coordinates according to certain embodiments of the present disclosure.

In certain embodiments, the step S120 "obtaining second spatial coordinates of the spatial entity" is shown in FIG. 3A and includes S121 and S122:

Step S121: Obtaining second spatial coordinates based on the second reference coordinate system.

Step S122: According to the coordinate system conversion information, converting second spatial coordinates into coordinates calibrated based on the first reference coordinate system.

In certain embodiments, the second reference coordinate system and the first reference coordinate system are different reference coordinate systems, second spatial coordinates is converted to coordinates based on the first reference coordinate system, according to the coordinate conversion information between the first reference coordinate system and the second reference coordinate system.

In certain embodiments, first spatial coordinates are converted to coordinates calibrated based on the second reference coordinate system according to the coordinate system conversion information. In this way, first spatial coordinates of the virtual three-dimensional object and second spatial coordinates of the spatial entity are calibrated using the same datum as the reference coordinate system.

In certain embodiments, second spatial coordinates is obtained based on the second reference coordinate system; and second spatial coordinates is converted into coordinates calibrated based on the first reference coordinate system, according to the coordinate system conversion information. In this way, first spatial coordinates of the virtual three-dimensional object and second spatial coordinates of the spatial entity are calibrated using the same datum as the reference coordinate system.

In certain embodiments, as shown in FIG. 3B, the step S140 of "reducing the display effect of the virtual three-dimensional object in the intersection space based on the position relationship" includes S141 and S142:

Step S141: Obtaining third spatial coordinate sof the viewer;

In certain embodiments, the camera device is used to acquire the third spatial coordinates of the viewer while acquiring the spatial entity. In certain embodiments, both the third spatial coordinates and second spatial coordinates are determined by the camera device, so the same reference coordinate system is used.

In certain embodiments, first spatial coordinates is converted into coordinates calibrated based on the second reference coordinate system according to the coordinate system conversion information, such that first spatial coordinates, the third spatial coordinates, and second spatial coordinates are based on a same reference coordinate system.

In certain embodiments, the third spatial coordinates and second spatial coordinates are converted to coordinates calibrated based on the first reference coordinate system according to the coordinate system conversion information, such that first spatial coordinates, the third spatial coordinates, and second spatial coordinates are based on a same reference coordinate system.

Step S142: Determining the positional relationship based on the third spatial coordinates, to determine whether the spatial entity interfering with the viewer's viewing of the virtual three-dimensional object;

The positional relationship between first spatial coordinates and second spatial coordinates may be a relative positional relationship between first spatial coordinates and second spatial coordinates, or may be an absolute positional relationship between first spatial coordinates and second spatial coordinates.

In certain embodiments, the positional relationship between first spatial coordinates and second spatial coordinates may be the relative positional relationship between first spatial coordinates and second spatial coordinates. In certain embodiments, relative positions between the viewer, the virtual three-dimensional object and the spatial entity are determined according to the third spatial coordinates, first spatial coordinates, and second spatial coordinates. In certain embodiments, and according to the relative positions, it is determined as to whether the positional relationship represents that the spatial entity interferes with the viewer's viewing of the virtual three-dimensional object.

In certain embodiments, the positional relationship between first spatial coordinates and second spatial coordinates is the absolute positional relationship between first spatial coordinates and second spatial coordinates. Whether the absolute positional relationship represents that a spatial entity interferes with the viewer's viewing of the virtual three-dimensional object is determined according to the third spatial coordinates.

Figure 3C:
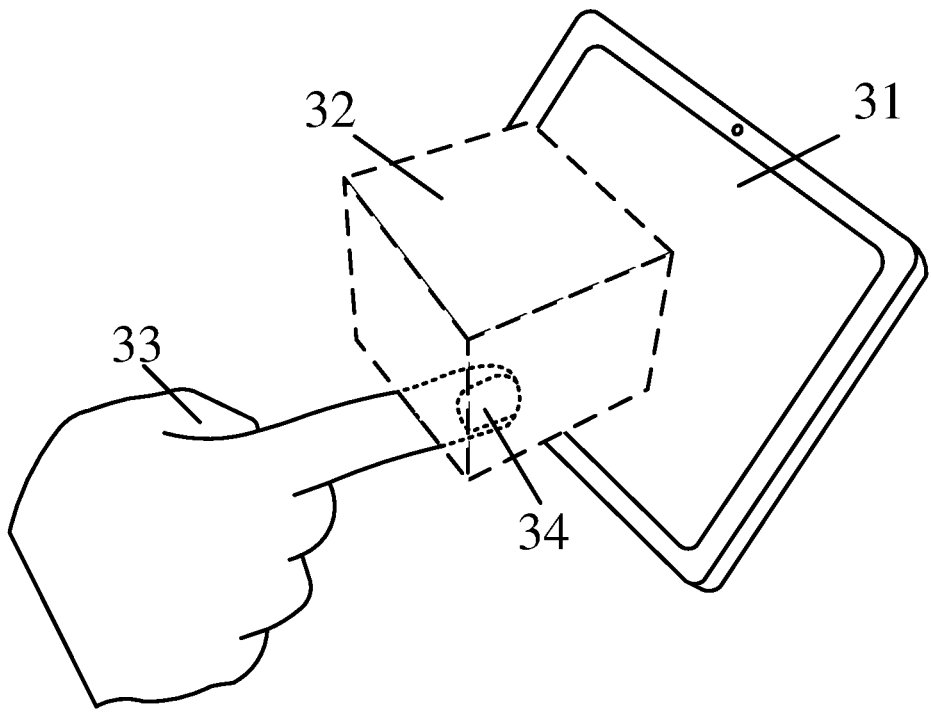
FIG. 3C is a schematic diagram of a virtual cube overlapping a hand according to certain embodiments of the present disclosure.

FIG. 3C is a schematic diagram of a virtual cube overlapping a hand, according to certain embodiments of the present disclosure. As shown in FIG. 3C, the schematic diagram includes a naked-eye 3D screen 31, a virtual cube 32, a hand 33, and an intersection space 34 between the hand 33 and the virtual cube 32.

When the viewer sees the naked-eye 3D screen 31, the intersection space 34 where the hand 33 and the virtual cube 32 are present is determined according to the viewer's third spatial coordinates, and the intersection space 34 is located inside the virtual cube, that is, interfering with the viewer's view of the virtual cube 32. By camouflaging or hiding the intersection space 34 in the virtual cube, an image of the virtual cube 32 does not include the intersection space 34.

In certain embodiments, when the positional relationship is determined based on the third spatial coordinates to represent that the spatial entity does not block the viewer from viewing the virtual three-dimensional object or does not interfere with the viewer's viewing of the virtual three-dimensional object, the display of the virtual three-dimensional object does not have to be processed, so as not to affect the viewer in viewing the virtual three-dimensional object.

Figure 3D:
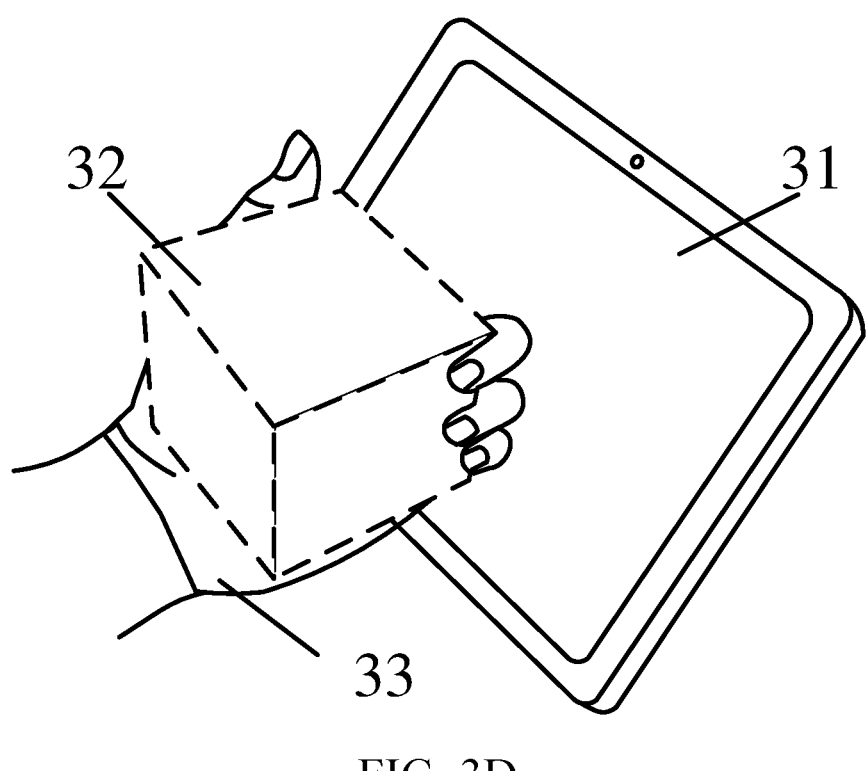
FIG. 3D is a schematic diagram of a virtual cube overlapping a hand according to certain embodiments of the present disclosure.

FIG. 3D is a schematic diagram of a virtual cube overlapping a hand according to certain embodiments of the present disclosure. As shown in FIG. 3D, the schematic diagram includes a naked-eye 3D screen 31, a virtual cube 32, and a hand 33.

When the viewer sees the naked-eye 3D screen 31, it is determined according to the viewer's third spatial coordinates that the hand 33 is located behind the virtual cube 32, that is, when the hand 33 does not block the viewer's viewing of the virtual cube 32 or does not interfere with the viewer's viewing of the virtual cube 32, it is determined that the hand 33 is located behind the virtual cube 32. The display of the virtual cube 32 is not processed so as not to affect the viewer's viewing of the virtual cube 32.

Step S143: Determining the portion to be hidden of or made invisible from the virtual three-dimensional object according to the intersection space.

In certain embodiments, the intersection space determined by first spatial coordinates and second spatial coordinates is used to represent or determine the overlapping portion between the virtual three-dimensional object and the spatial entity, that is, the portion to be hidden of or to be made invisible from the virtual three-dimensional object.

Step S144: Hiding in the naked-eye 3D source image the target source image corresponding to the portion to be hidden.

In certain embodiments, the source image of naked-eye 3D is a display image used to generate a virtual three-dimensional object.

In certain embodiments, by hiding in the naked-eye 3D source image the target source image corresponding to the portion to be hidden, it is possible to realize that an image of the virtual three-dimensional object does not include the portion to be hidden, or the portion to be hidden become invisible to the viewer.

In certain embodiments of the present disclosure, the third spatial coordinates of the viewer is obtained; and the positional relationship is determined based on the third spatial coordinates to represent that the spatial entity interfere with the viewer's viewing of the virtual three-dimensional object or blocks the viewer from fully viewing the virtual three-dimensional object; determining the portion to be hidden of the virtual three-dimensional object according to the intersection space; finally, hiding in the naked-eye 3D source image the target source image corresponding to the portion to be hidden. In this way, it is possible to determine the portion to be hidden of the virtual three-dimensional object using the viewer as a reference object, and to hide in the source image the target source image corresponding to the portion to be hidden, such that the portion to be hidden is not displayed in spatial imaging of the virtual three-dimensional object and therefore not visible to the viewer, and not to affect the viewer's three-dimensional viewing effect.

In certain embodiments, the step S144 of "hiding in the naked-eye 3D source image the target source image corresponding to the portion to be hidden" may include generating a naked-eye 3D three-dimensional object excluding the target source image. In certain embodiments, hiding in the naked-eye 3D source image the target source image may be performed by masking the target source image such that the target source image become invisible in the naked-eye 3D source image.

In certain embodiments, the generation of the naked-eye 3D object that does not include the target source image may be processed at the model level, that is, by generating a 3D object model after the target source image is removed.

In certain embodiments of the present disclosure, by generating a naked-eye 3D object that does not include the target source image, it is possible to hide in the naked-eye 3D source image the target source image corresponding to the portion to be hidden, and further realize that the virtual three-dimensional object does not display the portion to be hidden, to avoid impact on the viewer's three-dimensional viewing effect.

In certain embodiments, the step S144 of "hiding in the naked-eye 3D source image the target source image corresponding to the portion to be hidden" includes in the naked-eye 3D source image, rendering the target source image such that the portion to be hidden is not displayed, or is displayed in black.

In certain embodiments, the target source image corresponding to the portion to be hidden may be processed at the rendering level, that is, the part of the spatial entity blocked by the virtual three-dimensional object is rendered empty (or color black) during rendering.

In certain embodiments of the present disclosure, the target source image may be rendered in the naked-eye 3D source image such that the portion to be hidden is not displayed or displayed in black, thereby achieving a three-dimensional viewing effect that does not affect the viewer.

In certain embodiments, the step S130 "determining the intersection space and positional relationship between the virtual three-dimensional object and the spatial entity according to first spatial coordinates and second spatial coordinates" as shown in FIG. 4, is achieved by performing steps S131 and S132:

Step S131: Obtaining the viewer's viewpoint.

Step S132: Determining the intersection space and positional relationship between the virtual three-dimensional object and the spatial entity, using the viewpoint as a reference, and according to first spatial coordinates and second spatial coordinates.

In some naked-eye 3D implementations, the rendering angle of the virtual three-dimensional object changes with the viewer's viewpoint, and in certain instances, the changes are synchronous. For example, when a viewer looks at a virtual apple in naked-eye 3D, the viewer can see the left side of the apple when the viewer's head is tilted to the left, and the right side of the apple can be seen when the viewer's head is tilted to the right. In certain embodiments where the rendering angle changes with the viewpoint, when hiding an image of virtual three-dimensional objects, the current viewpoint is used as the basis to determine which portion of the virtual three-dimensional object is blocked by the spatial entity at this viewpoint and the portion is to be hidden or rendered invisible. When it is determined that the spatial entity does not block the virtual three-dimensional object at this viewpoint, the display of the virtual three-dimensional object may not be processed so as not to affect the normal display effect of the virtual three-dimensional object. In certain embodiments, the viewpoint position is tracked and acquired through the camera device.

In certain embodiments of the present disclosure, the viewer's viewpoint is obtained; and according to the viewpoint and first spatial coordinates and second spatial coordinates, the intersection space and positional relationship between the virtual three-dimensional object and the spatial entity are determined. In this way, the intersection space and positional relationship between the virtual three-dimensional object and the spatial entity based on the viewer's viewpoint may be more accurately determined to determine the portion to be hidden that otherwise affects the viewing effect. By hiding the display of the portion to be hidden, an interference to the viewer's three-dimensional viewing effect is avoided.

The present disclosure in certain embodiments provides an image processing device. The device includes various modules. Each module may include sub-modules, which may be implemented by a processor in an electronic device, or implemented by a specific logic circuit. The processor may be a central processing unit (CPU), a microprocessor unit (MPU), a digital signal processor (Digital Signal Process, DSP) or a field programmable gate array (Field Programmable Gate Array, FPGA), or the like.

Figure 5:
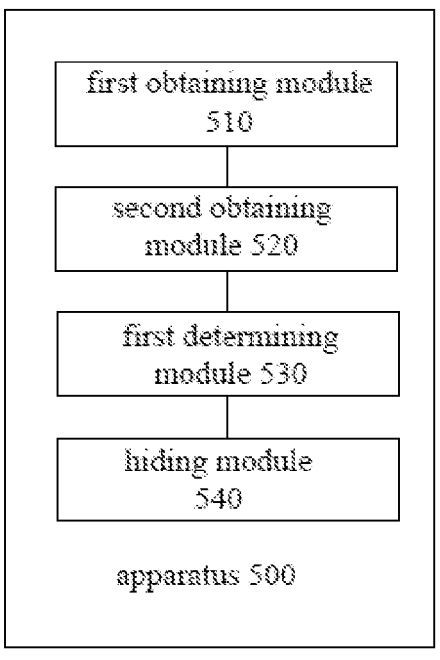
FIG. 5 is a schematic structural diagram of an image processing apparatus according to certain embodiments of the present disclosure.

FIG. 5 is a schematic structural diagram of an image processing apparatus according to certain embodiments of the present disclosure. As shown in FIG. 5, the apparatus 500 includes: a first obtaining module 510, configured to obtain first spatial coordinates of a virtual three-dimensional object, where the virtual three-dimensional object is a three-dimensional object displayed in space in naked-eye 3D; a second obtaining module 520, configured to obtain second spatial coordinates of the spatial entity; a first determining module 530, configured to determine the intersection space and positional relationship between the virtual three-dimensional object and the spatial entity according to first spatial coordinates and second spatial coordinates; a hiding module 540, configured to reduce the display effect of the virtual three-dimensional object in the intersection space according to the position relationship.

In certain embodiments, first spatial coordinates is calibrated based on the first reference coordinate system of the virtual three-dimensional object, and the device further includes a third obtaining module, a fourth obtaining module, and a second determination module, where, the third obtaining module is used to obtain the first reference coordinate system; the fourth obtaining module is used to obtain the second reference coordinate system of the spatial entity; the second determination module is used to obtain coordinate system conversion information according to the second reference coordinate system and the first reference coordinate system.

In certain embodiments, the second obtaining module includes a first obtaining sub-module and a first conversion sub-module, where the first obtaining sub-module is used to obtain second spatial coordinates according to the second reference coordinate system; the first conversion sub-module is used to convert second spatial coordinates into coordinates calibrated based on the first reference coordinate system according to the coordinate system conversion information.

In certain embodiments, the hiding module includes a second obtaining sub-module, a first determining sub-module, a second determining sub-module and a hiding sub-module, where the second obtaining sub-module is used to obtain the viewer's third spatial coordinates; the first determining sub-module is used to determine that the positional relationship based on the third spatial coordinates represents that the spatial entity interferes with the viewer's viewing of the virtual three-dimensional object; the second determining sub-module is used to determine the portion to be hidden of the virtual three-dimensional object based on the intersection space; and the hiding submodule is used to hide in the naked-eye 3D source image the target source image corresponding to the portion to be hidden.

In certain embodiments, the hiding sub-module is used to generate a naked-eye 3D object that does not include the target source image.

In certain embodiments, the hiding sub-module is also used to render the target source image in the naked-eye 3D source image such that the portion to be hidden is not displayed or is displayed in black.

In certain embodiments, the first determining module includes a third obtaining sub-module and a third determining sub-module, where the third obtaining sub-module is used to obtain the viewer's viewpoint; the third determining module is used to determine the intersection space and positional relationship between the virtual three-dimensional object and the spatial entity, using the viewer's viewpoint as a reference and according to first spatial coordinates and second spatial coordinates.

The image processing device and the image processing method described herein may relate to same or similar features, and may impart similar technical improvement. For technical details not disclosed in the image processing device, reference may be made to corresponding features disclosed in relation to the image processing method according to certain embodiments of the present disclosure.

In certain embodiments, when the image processing method is implemented in the form of a software function module and sold or used as an independent product, the image processing method may also be stored in a computer-readable storage medium. The technical solutions of certain embodiments of the present disclosure may be embodied in the form of software products. The computer software product is stored in a storage medium and includes a number of instructions to enable the electronic device (which may be a mobile phone, tablet computer, notebook computer, desktop computer, the like) to execute all or part of the image processing method. The storage media may include U disk, mobile hard disk, read only memory (Read Only Memory, ROM), magnetic disk, optical disk, or any other media that may store program codes. The present disclosure in certain embodiments employs any suitable hardware and software and combinations thereof.

The present disclosure in certain embodiments provides a storage medium on which a computer program is stored. When the computer program is executed by a processor, the steps in the image processing method are implemented.

Figure 6:
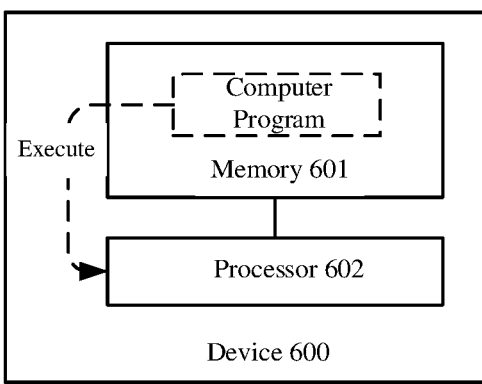
FIG. 6 is a hardware entity diagram of an electronic device according to certain embodiments of the present disclosure.

The present disclosure in certain embodiments provides an electronic device. FIG. 6 is a schematic diagram of a hardware entity of the electronic device according to certain embodiments of the present disclosure. As shown in FIG. 6, the hardware entity of device 600 includes: a memory 601 and a processor 602. Memory 601 stores a computer program that may be run on processor 602. When the processor 602 executes the program, the steps in the image processing method are implemented.

The memory 601 is configured to store instructions and implementations executable by the processor 602, and may cache data to be processed or processed by the processor 602 and each module in the electronic device 600 (for example, image data, audio data, voice communication data and video communication data), which may be implemented through flash memory (FLASH) or random access memory (Random Access Memory, RAM).

The storage medium and the image processing device described herein may relate to same or similar features, and may impart similar technical improvement. For technical details not disclosed in the storage medium and or in the image processing device, reference may be made to corresponding features disclosed in relation to the image processing method according to certain embodiments of the present disclosure.

In certain embodiments of the present disclosure, the term "one embodiment" or "an embodiment" refers to a particular feature, structure, or characteristic associated with the embodiment. The term "in one embodiment" or "in an embodiment" according to certain embodiments of the present disclosure are not necessarily referring to the same embodiment. Furthermore, particular features, structures or characteristics may be combined in any suitable manner in one or more embodiments. In certain embodiments of the present disclosure, sequence numbers used in describing the image processing method do not necessarily mean any order of performing the method. In certain embodiments, the execution order of each process may be determined by its functions and internal logic. The sequence numbers or serial numbers used herein are only for description and do not represent a preference of the embodiments described.

In certain embodiments, the terms "comprising," "comprises," or any other variations thereof are intended to cover a non-exclusive inclusion, such that a process, method, apparatus, or device that includes a series of elements not only includes those elements, also includes other elements not expressly listed or inherent in the process, method, apparatus, or apparatus. Unless otherwise noted, an element defined by the statement "comprises a . . ." does not exclude the presence of another identical element in a process, method, apparatus, or device that includes the element.

The image processing apparatus, the electronic device, and the image processing method described herein may be implemented in any other suitable ways. The image processing apparatus and electronic device described herein are only illustrative. For example, the division of the units is only a logical function division. In actual implementation, there may be other division methods, such as: multiple units or components may be combined, or integrated into another system, or some features may be ignored, or not implemented. In addition, the coupling, direct coupling, or communication connection between the components shown or discussed may be through some interfaces, and the indirect coupling or communication connection of the devices or units may be electrical, mechanical, or of other forms.

The units described herein as separate components may or may not be physically separated; the components shown as units may or may not be physical units; they may be located in one place or distributed to multiple network units; some or all of the units may be selected to achieve the realization of certain embodiments of the present disclosure.

In addition, all functional units in certain embodiments of the present disclosure may be integrated into one processing unit, or each unit may be separately used as a unit, or two or more units may be integrated into one unit; the above-mentioned integration unit may be implemented in the form of a hardware or in the form of a hardware plus software functional units.

All or part of the steps to implement the image processing method may be performed by hardware related to program instructions. The program may be stored in a computer-readable storage medium. When the program is executed, the execution includes: the steps of the image processing method; and the storage medium includes removable storage devices, read-only memory (Read Only Memory, ROM), magnetic disks or optical disks and other various media that can store program codes.

Alternatively, if the integrated units mentioned in the present disclosure are implemented in the form of software function modules and sold or used as independent products, they may also be stored in a computer-readable storage medium. Technical solutions of certain embodiments of the present disclosure may be embodied in the form of software products. The computer software product is stored in a storage medium and includes instructions to enable the electronic device (which may be a mobile phone, tablet computer, notebook computer, desktop computer, the like) to execute all or part of the methods described in various embodiments of the present disclosure. The storage medium includes mobile storage devices, ROMs, magnetic disks, optical disks and other media that may store program codes.

The methods disclosed in several method embodiments provided in the present disclosure may be combined arbitrarily to obtain new method embodiments without conflict.

The features disclosed in several product embodiments provided in the present disclosure may be combined arbitrarily without conflict to obtain new product embodiments.

The features disclosed in several method or device embodiments provided in the present disclosure may be combined arbitrarily without conflict to obtain new method embodiments or device embodiments.

The above are only embodiments of the present disclosure, but the protection scope of the present disclosure is not limited thereto. Any suitable changes or replacements within the technical scope disclosed in the present disclosure are covered by the protection scope of the present disclosure. Therefore, the protection scope of the present disclosure should be subject to the protection scope of the claims.

What is claimed is:

1. An image processing method, comprising:
obtaining first spatial coordinates of a virtual three-dimensional object, wherein the virtual three-dimensional object is a three-dimensional object displayed in space in naked-eye 3D;
obtaining second spatial coordinates of a spatial entity;
obtaining third spatial coordinates of a viewer;
according to the first spatial coordinates and the second spatial coordinates, and using a viewpoint of the viewer derived from the third spatial coordinates as a reference, determining an intersection space and a positional relationship between the virtual three-dimensional object and the spatial entity; and
hiding a display of the virtual three-dimensional object in the intersection space according to the positional relationship, comprising hiding, in a naked-eye 3D source image used to generate the virtual three-dimensional object, a target source image corresponding to a portion of the virtual three-dimensional object that lies in the intersection space at the viewpoint of the viewer, wherein the hiding, in the naked-eye 3D source image, the target source image comprises generating a naked-eye 3D three-dimensional object excluding the target source image, and wherein the generating the naked-eye 3D three-dimensional object excluding the target source image is processed at a model level by removing the target source image and generating a three-dimensional object model after the target source image is removed.

2. The method of claim 1, further comprising:
obtaining a first reference coordinate system;
obtaining a second reference coordinate system of the spatial entity; and
determining coordinate system transformation information according to the second reference coordinate system and the first reference coordinate system.

3. The method of claim 2, wherein the first reference coordinate system comprises a coordinate system of a 3D screen, the second reference coordinate system comprises a coordinate system of a camera device that acquires the second spatial coordinates, and the determining the transformation information includes calibrating a positional relationship between the camera device and the 3D screen.

4. The method according to claim 2, wherein obtaining second spatial coordinates of the spatial entity comprises:

obtaining the second spatial coordinates according to the second reference coordinate system; and
according to the coordinate system conversion information, converting the second spatial coordinates to coordinates calibrated based on the first reference coordinate system.

5. The method of claim 1, wherein the positional relationship indicates whether the spatial entity interferes with the viewer's viewing of the virtual three-dimensional object.

6. The method of claim 5, further comprising:
in the naked-eye 3D source image, rendering the target source image such that the portion to be hidden is not displayed, or is displayed in black.

7. An image processing apparatus, comprising: a memory storing computer program instructions; and a processor coupled to the memory and configured to execute the computer program instructions and perform:
obtaining first spatial coordinates of a virtual three-dimensional object, wherein the virtual three-dimensional object is a three-dimensional object displayed in space in naked-eye 3D;
obtaining second spatial coordinates of a spatial entity;
obtaining third spatial coordinates of a viewer;
according to the first spatial coordinates and the second spatial coordinates, and using a viewpoint of the viewer derived from the third spatial coordinates as a reference, determining an intersection space and a positional relationship between the virtual three-dimensional object and the spatial entity; and
hiding a display of the virtual three-dimensional object in the intersection space according to the positional relationship, comprising hiding, in a naked-eye 3D source image used to generate the virtual three-dimensional object, a target source image corresponding to a portion of the virtual three-dimensional object that lies in the intersection space at the viewpoint of the viewer, wherein the hiding, in the naked-eye 3D source image, the target source image comprises generating a naked-eye 3D three-dimensional object excluding the target source image, and wherein the generating the naked-eye 3D three-dimensional object excluding the target source image is processed at a model level by removing the target source image and generating a three-dimensional object model after the target source image is removed.

8. The apparatus of claim 7, wherein the processor is configured to further perform:
obtaining a first reference coordinate system;
obtaining a second reference coordinate system of the spatial entity; and
determining coordinate system transformation information according to the second reference coordinate system and the first reference coordinate system.

9. The apparatus of claim 8, wherein obtaining second spatial coordinates of the spatial entity includes:
obtaining the second spatial coordinates according to the second reference coordinate system; and
according to the coordinate system conversion information, converting the second spatial coordinates to coordinates calibrated based on the first reference coordinate system.

10. The apparatus of claim 7, wherein the positional relationship indicates whether the spatial entity interferes with the viewer's viewing of the virtual three-dimensional object.

11. The apparatus of claim 10, wherein the processor is configured to further perform:

in the naked-eye 3D source image, rendering the target source image such that the portion to be hidden is not displayed, or is displayed in black.

12. A non-transitory computer-readable storage medium storing computer program instructions executable by at least one processor to perform:

obtaining first spatial coordinates of a virtual three-dimensional object, wherein the virtual three-dimensional object is a three-dimensional object displayed in space in naked-eye 3D;

obtaining second spatial coordinates of a spatial entity;

obtaining third spatial coordinates of a viewer;

according to the first spatial coordinates and the second spatial coordinates, and using a viewpoint of the viewer derived from the third spatial coordinates as a reference, determining an intersection space and a positional relationship between the virtual three-dimensional object and the spatial entity; and hiding a display of the virtual three-dimensional object in the intersection space according to the positional relationship, comprising hiding, in a naked-eye 3D source image used to generate the virtual three-dimensional object, a target source image corresponding to a portion of the virtual three-dimensional object that lies in the intersection space at the viewpoint of the viewer, wherein the hiding, in the naked-eye 3D source image, the target source image comprises generating a naked-eye 3D three-dimensional object excluding the target source image, and wherein the generating the naked-eye 3D three-dimensional object excluding the target source image is processed at a model level by removing the target source image and generating a three-dimensional object model after the target source image is removed.

13. The non-transitory computer-readable storage medium of claim 12, wherein the computer program instructions are executable by the at least one processor to further perform:

obtaining a first reference coordinate system;

obtaining a second reference coordinate system of the spatial entity; and determining coordinate system transformation information according to the second reference coordinate system and the first reference coordinate system.

14. The non-transitory computer-readable storage medium of claim 13, wherein obtaining second spatial coordinates of the spatial entity includes:

obtaining second spatial coordinates according to the second reference coordinate system; and according to the coordinate system conversion information, converting the second spatial coordinates to coordinates calibrated based on the first reference coordinate system.

15. The non-transitory computer-readable storage medium of claim 12, wherein the positional relationship indicates whether the spatial entity interferes with the viewer's viewing of the virtual three-dimensional object.

16. The non-transitory computer-readable storage medium of claim 15, wherein the computer program instructions are executable by the at least one processor to further perform:

in the naked-eye 3D source image, rendering the target source image such that the portion to be hidden is not displayed, or is displayed in black.

* * * * *